United States Patent
Cheng et al.

(10) Patent No.: US 7,123,387 B2
(45) Date of Patent: Oct. 17, 2006

(54) IMAGE SCANNING METHOD

(76) Inventors: Chung-Wei Cheng, 1F., No. 799-1, Junghua Rd., Hsinchu (TW); Stone Cheng, No. 187, Pingdeng Rd., Tzguan Shiang, Kaohsiung (TW)

( * ) Notice: Subject to any disclaimer, the term of this patent is extended or adjusted under 35 U.S.C. 154(b) by 876 days.

(21) Appl. No.: 10/226,199

(22) Filed: Aug. 23, 2002

(65) Prior Publication Data

US 2004/0036926 A1    Feb. 26, 2004

(51) Int. Cl.
*H04N 1/04* (2006.01)
*G03F 3/10* (2006.01)
*G06K 9/00* (2006.01)

(52) U.S. Cl. .............. 358/474; 358/527; 358/444; 382/318; 382/319

(58) Field of Classification Search ............ 358/527, 358/505, 523, 524, 518–522, 452, 453, 444, 358/442, 474; 382/274, 318, 319, 312
See application file for complete search history.

(56) References Cited

U.S. PATENT DOCUMENTS 5,444,544 A * 8/1995 Oka et al. ............... 386/1
5,962,205 A * 10/1999 Arakawa et al. ......... 430/503
6,542,173 B1 * 4/2003 Buckley ................... 715/841
6,717,585 B1 * 4/2004 Kagawa et al. .......... 345/600
6,798,530 B1 * 9/2004 Buckley et al. ......... 358/1.13
6,819,439 B1 * 11/2004 Hayashi et al. ......... 358/1.13
6,901,162 B1 * 5/2005 Kagawa et al. .......... 382/162

FOREIGN PATENT DOCUMENTS

JP    2001189860 A *  7/2001

* cited by examiner

*Primary Examiner*—Cheukfan Lee
(74) *Attorney, Agent, or Firm*—Berkeley Law & Technology Group, LLC

(57) ABSTRACT

An image scanning method includes pre-scanning a first document to generate a first original image according to the first document; adjusting parameter settings of the first original image to generate and store a plurality of pre-view images corresponding to different sets of parameters; pre-scanning a second document to generate a second original image according to the second document; and scanning the second document to generate a plurality of scanning images according to the different sets of parameters of the pre-view images. The parameter settings of the first original image include brightness, shadow, and contrast settings.

4 Claims, 2 Drawing Sheets

IMAGE SCANNING METHOD

BACKGROUND OF THE INVENTION

1. Field of the Invention

The invention relates in general to a method of image scanning and outputting, and more particularly to a method of image scanning and outputting, which is applied to an image scanner.

2. Description of the Related Art

Image scanners are known as essential devices in a variety of personal computer peripherals. Referring to FIG. 1, a flow chart of a conventional image scanning method is shown. The conventional scanning method includes following approaches. In the first step 110, a driver is actuated. Accordingly, in the step 120, a document to be scanned on a scan flat bed is pre-scanned for one time by a scanning module driven by the driver to generate an original image. Subsequently, in the step 130, parameter settings of the original image, such as brightness, shadow, and contrast settings, are adjusted by the user to generate a pre-view image. In the step 140, the document to be scanned is then scanned according to the pre-view image by the image scanner. Lastly, in the step 150, the image scanning process is completed to generate a scanning image.

As described above, in the conventional image scanning method, the document to be scanned is pre-scanned firstly to generate an original image. A pre-view image is then generated by adjusting parameter settings of the original image, such as brightness, shadow, and contrast setting. Lastly, the document to be scanned is scanned to generate the scanning image with the set of parameters of the pre-view image and complete the scanning process.

However, only one pre-view image with the adjusted parameter setting and only one set of parameters corresponding to the pre-view image are stored after the pre-scanning operation. When the only set of parameters is applied to the original image generated by pre-scanning another document to be scanned, only one pre-view image of another document to be scanned with the only set of parameters will be generated.

Consequently, the conventional image scanning method has the following disadvantages:

1. The scanning time is too long. The parameter settings of the previous document to be scanned fail to be applied to a new document to be scanned for outputting several scanning images with the same set of parameters. Therefore, the parameter settings should be adjusted again whenever a new document is to be scanned, which increases the scanning time.

2. It is easy to make mistakes during the operation of adjusting parameter settings again. To adjust parameter settings again not only complicates the scanning process but also makes the new adjusted parameter settings inconsistent with the parameter settings of the previous documents easily.

SUMMARY OF THE INVENTION

It is therefore an object of the invention to provide an image scanning method, so that the scanning time can be shorten without the need of adjusting the parameter settings again.

According to the objective of the invention, an image scanning method for an image scanner is provided. The image scanning method includes pre-scanning a first document to generate a first original image according to the first document; adjusting parameter settings of the first original image to generate and store a plurality of pre-view images corresponding to different sets of parameters; pre-scanning a second document to generate a second original image according to the second document; and scanning the second document to generate a plurality of scanning images with different sets of parameters of the pre-view images. The parameter settings of the first original image include brightness, shadow, and contrast settings.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
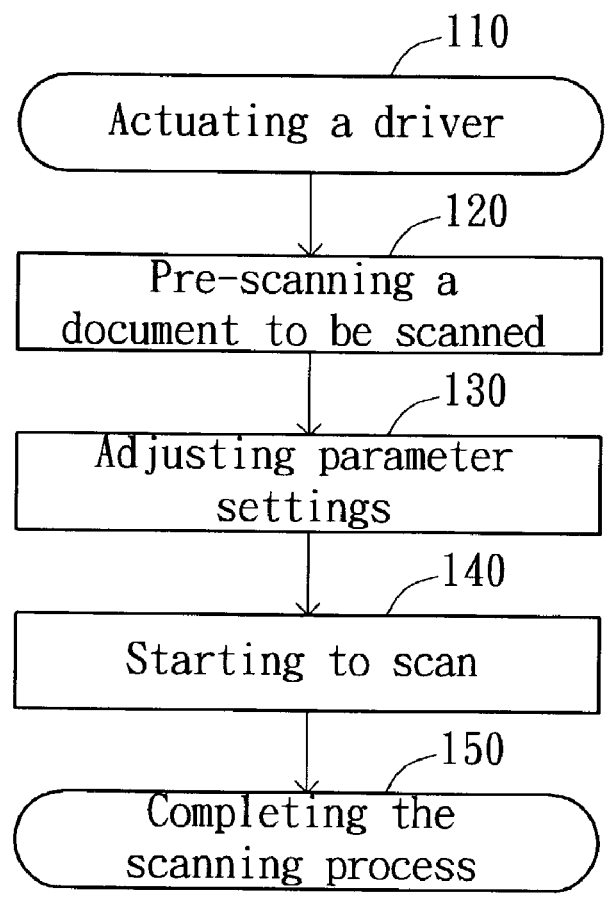
FIG. 1 is a flow chart showing a conventional image scanning method.
Figure 2:
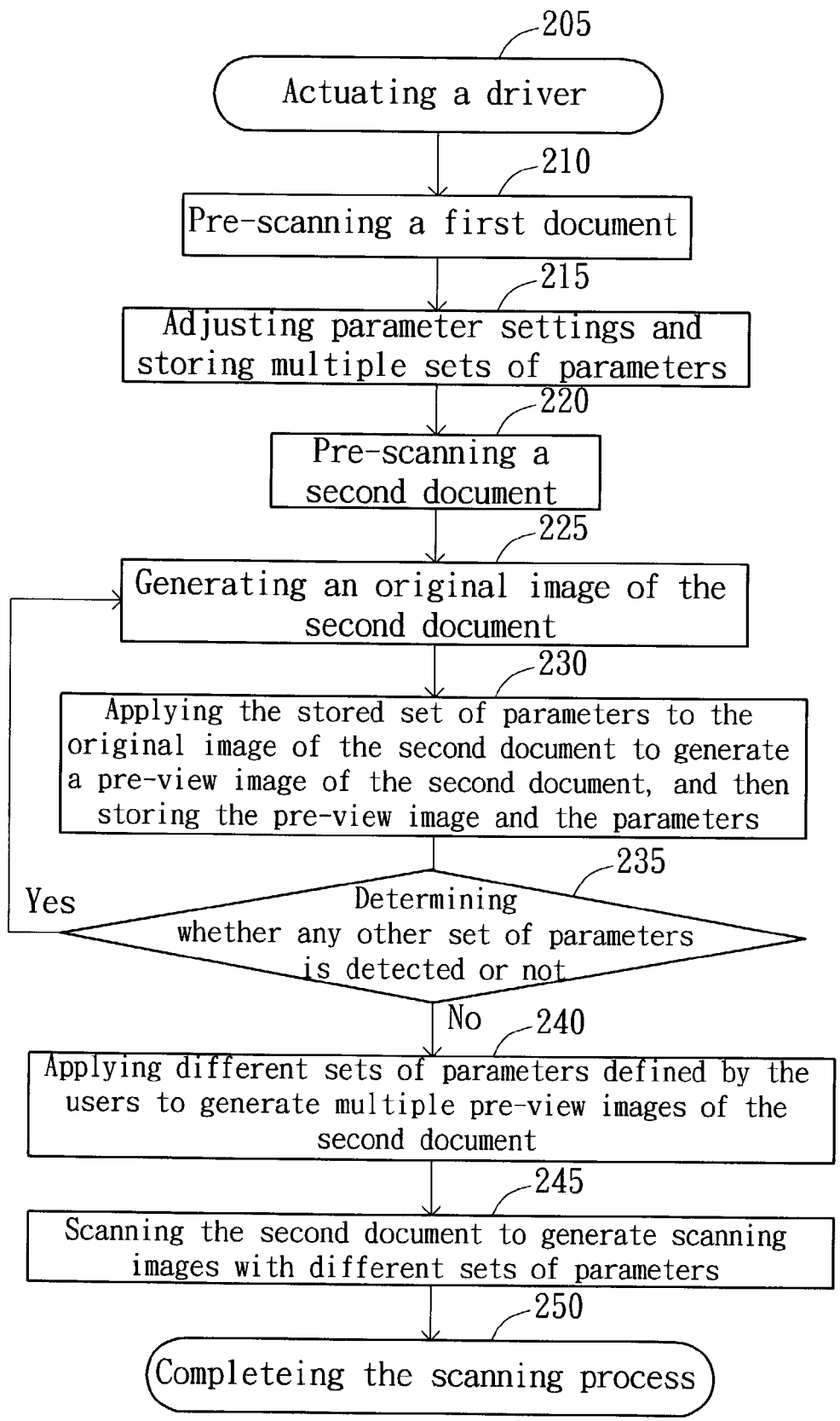
FIG. 2 is a flow chart of the image scanning method according to a preferred embodiment of the invention.

Referring to FIG. 2, a flow chart of the image scanning method according to a preferred embodiment of the invention is shown, which includes the following procedures. In the first step 205, a driver is actuated. Accordingly, in the step 210, a first document to be scanned on a scan flat bed is pre-scanned for one time by a scanning module driven by the driver to generate an original image of the first document. Subsequently, in the step 215, parameter settings such as brightness, shadow, and contrast settings are adjusted according to the original image of the first document by the user to generate multiple pre-view images and then multiple sets of parameters are stored. In the step 220, a second document to be scanned on the scan flat bed is pre-scanned for one time and an original image of the second document is generated in the step 225. Furthermore, in the step 230, the stored set of parameters is applied to the original image of the second document to generate a pre-view image of the second document, and then the pre-view image and the set of parameters are stored. In the step 235, the image scanner determines whether any other set of parameters is detected or not. If not, the method proceeds to the step 240. If any other set of parameters is detected, the method goes back to the step 225. In the step 240, different sets of parameters defined by the user are applied to generate multiple pre-view images of the second document. In the step 245, the second document is scanned according to the parameter settings of these pre-view images of the second document by the image scanner. In the last step 250, the preview images with different sets of parameters of the second document are used in the image scanning to generate scanning images with different sets of parameters and the scanning process is completed.

It is noticed that all the parameter settings such as brightness, shadow, and contrast settings of the pre-view images according to the second document can be obtained from the parameter settings of the pre-view images according to the first document. The main spirit of the image scanning method according to the invention is capable of storing multiple pre-view images and multiple corresponding sets of parameters at a time. Moreover, the stored parameters can be applied again to the original image generated by pre-scanning a new document to be scanned.

The method according to the invention, all the original images and the pre-view images can be displayed by a display interface. The display interface can be a display window.

In the preferred embodiment described herein, the advantages of according to the invention are as below:

1. The scanning time is shortened. The parameter settings according to the previous documents can be applied again to a new document to be scanned for outputting several scanning images with the same set of parameter settings, so that the scanning time can be shortened.

2. The parameter settings for a new document to be scanned need not to be adjusted again and therefore no mistake will be made. Not only the scanning process can be simplified but also the new adjusted parameter settings will be consistent with the parameter settings of the previous documents.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A image scanning method for an image scanner, the method comprising:
   pre-scanning a first document to generate a first original image according to the first document;
   adjusting parameter settings of the first original image to generate and store a plurality of pre-view images corresponding to different sets of parameters;
   pre-scanning a second document to generate a second original image according to the second document; and
   scanning the second document to generate a plurality of scanning images with the different sets of parameters of the pre-view images.

2. The method according to claim 1, wherein the parameter settings of the first original image include brightness, shadow, and contrast settings.

3. The method according to claim 2, wherein the first original image, the pre-view images, and the second original image are displayed by a display interface.

4. The method according to claim 3, wherein the display interface is a display window.

* * * * *